(12) United States Patent
Zhong et al.

(10) Patent No.: US 9,581,766 B2
(45) Date of Patent: Feb. 28, 2017

(54) SNAP-FIT STRUCTURE AND OPTICAL FIBER SPLICE EMPLOYING THE SNAP-FIT STRUCTURE

(71) Applicant: SUNSEA TELECOMMUNICATIONS Co. LTD., ShenZhen (CN)

(72) Inventors: Cheng Zhong, ShenZhen (CN); Xinjun Chen, ShenZhen (CN); Qiyue Wang, ShenZhen (CN)

(73) Assignee: SUNSEA TELECOMMUNICATIONS Co. LTD., Shenzhen (CN)

( * ) Notice: Subject to any disclaimer, the term of this patent is extended or adjusted under 35 U.S.C. 154(b) by 0 days.

(21) Appl. No.: 15/057,689

(22) Filed: Mar. 1, 2016

(65) Prior Publication Data
US 2016/0178848 A1  Jun. 23, 2016

Related U.S. Application Data

(63) Continuation of application No. PCT/CN2013/082928, filed on Sep. 14, 2013.

(51) Int. Cl.
*G02B 6/38* (2006.01)
*G02B 6/36* (2006.01)

(52) U.S. Cl.
CPC ......... *G02B 6/3803* (2013.01); *G02B 6/3806* (2013.01); *G02B 6/3809* (2013.01); *G02B 6/3846* (2013.01)

(58) Field of Classification Search
CPC .... G02B 6/3887; G02B 6/387; G02B 6/3806; G02B 6/3803; G02B 6/3802; G02B 6/3807

USPC ......... 385/56, 62, 63, 65, 81, 83, 87, 88, 92
See application file for complete search history.

(56) References Cited

U.S. PATENT DOCUMENTS

| | | | |
|---|---|---|---|
| 2010/0098381 A1* | 4/2010 | Larson | G02B 6/3846 385/60 |
| 2012/0121222 A1* | 5/2012 | Castonguay | G02B 6/3887 385/78 |

FOREIGN PATENT DOCUMENTS

| | | |
|---|---|---|
| CN | 1833188 A | 9/2006 |
| CN | 101501545 A | 8/2009 |
| CN | 202486359 U | 10/2012 |
| CN | 202548381 U | 11/2012 |
| CN | 202771043 U | 3/2013 |
| CN | 203414635 U | 1/2014 |
| JP | 5255540 B2 | 8/2013 |

\* cited by examiner

*Primary Examiner* — Kaveh C Kianni
*Assistant Examiner* — Hung Lam
(74) *Attorney, Agent, or Firm* — IPro, PLLC; Na Xu

(57) ABSTRACT

Disclosed are a snap-fit structure and an optical fiber splicer using the snap-fit structure. The snap-fit structure comprises a cable retainer and a base, the base being provided with a snap-fit hole, the cable retainer being provided with an ear clip, during assembling, the clip being fitted into the snap-fit hole, wherein a second outer lateral surface is arranged in a rising direction of the ear clip, the second outer lateral surface in the rising direction of the ear clip and a wall surface of the cable retainer forming a wedge smaller at the top and larger at the bottom.

11 Claims, 5 Drawing Sheets

SNAP-FIT STRUCTURE AND OPTICAL FIBER SPLICE EMPLOYING THE SNAP-FIT STRUCTURE

TECHNICAL FIELD

The present invention relates to the technical field of hardware structures for optical fiber connections, and in particular, relates to a snap-fit structure and an optical fiber splicer employing the snap-fit structure.

BACKGROUND

The optical fiber communication technology, outstanding from various communications technologies, has become one of the major communications technologies in modern communications field and is playing an important role in the modern communications networks.

In the course of the fiber to the home (FTTH), it is required that optical fibers are fixed secured with a sufficient force to accommodate routing of the optical fibers. In addition, it is required that the disassembling is convenient to accommodate the requirements of quick and convenient detection and repair. Snap-fit structures of the conventional optical fiber connectors are capable of accommodating the requirement of securely fixing the optical fibers. However, the disassembling is not convenient, thereby failing to accommodate the requirements of quick and convenient detection and repair.

SUMMARY

An objective of the present invention is to provide a snap-fit structure and an optical fiber splicer using the snap-fit structure. According to the present invention, the disassembling is convenient, and the requirements of quick and convenient detection, reassembling and repair of the optical fiber connector are accommodated.

To achieve the objective, the present invention employs the following technical solutions:

a snap-fit structure is provided, comprising a cable retainer and a base, the base being provided with a snap-fit hole, the cable retainer being provided with an ear clip, during assembling, the ear clip being fitted into the snap-fit hole, wherein a second outer lateral surface is arranged in a rising direction of the ear clip, the second outer lateral surface in the rising direction of the ear clip and a wall surface of the cable retainer forming a wedge smaller at the top and larger at the bottom.

A lower wall surface of the ear clip is parallel to a wall surface of the snap-fit hole.

A forward direction in which the first outer lateral surface of the ear clip is assembled into the base along the cable retainer and the wall surface of the cable retainer form a wedge smaller at the front larger at the rear, and a rear wall surface of the ear clip is parallel to the wall surface of the snap-fit hole.

Preferably, the first outer lateral surface and the wall surface of the cable retainer form an angle of 5 to 80 degrees.

A rear portion of the base is of a U shape, the cable retainer is of an inverted U shape, and after the cable retainer is assembled into the base, an opening at a lower end of the cable retainer is sealed by the base.

Preferably, the snap-fit hole is arranged on two arms of the base, the ear clip is arranged on two arms of the cable retainer, and the second outer lateral surface and the wall surface of the cable retainer form an angle of 5 to 80 degrees.

The snap-fit structure further comprises an upper cover, wherein after upon completion of assembling, an upper portion of the upper cover presses against an upper surface of the cable retainer, and a lower portion of the upper cover is fit into a bottom surface of the base.

The ear clip further comprises a third outer lateral surface, wherein the third outer lateral surface is parallel to the wall surface of the cable retainer, the first outer lateral surface intersects the third outer lateral surface, and the second outer lateral surface intersects the third outer lateral surface.

Preferably, the intersection between the first outer lateral surface and the second outer lateral surface is an arc transitional structure.

A cable gripping rib is arranged on an inner wall surface of the cable retainer.

Preferably, the cable gripping ribs are pairedly and symmetrically arranged on the inner wall surface of the cable retainer.

Three pairs of cable gripping ribs are used.

The present invention further provides an optical fiber splicer, comprising the above snap-fit structure.

Preferably, the optical fiber splicer is an optical fiber connector or an optical mechanical splice.

The present invention achieves the following beneficial effects: a snap-fit structure comprises a cable retainer and a base, the base being provided with a snap-fit hole, the cable retainer being provided with an ear clip, during assembling, the ear clip being fitted into the snap-fit hole, wherein a second outer lateral surface is arranged in a rising direction of the ear clip, the second outer lateral surface in the rising direction of the ear clip and a wall surface of the cable retainer forming a wedge smaller at the top and larger at the bottom. During disassembling, the ear clip is lifted upwards; since the second outer lateral surface in the rising direction of the ear clip and a wall surface of the cable retainer form a wedge smaller at the top and larger at the bottom, the ear clip may be separated from the snap-fit hole by applying a smaller force, and thus the cable retainer is detached from the base. Therefore, the disassembling is convenient, and the requirements of quick and convenient detection, reassembling and repair of the optical fiber connector are accommodated.

BRIEF DESCRIPTION OF THE DRAWINGS

To describe the technical solutions in the embodiments of the present invention, drawings that are to be referred for description of the embodiments are briefly described hereinafter. Apparently, the drawings described hereinafter merely illustrate some embodiments of the present invention. Persons of ordinary skill in the art may also derive other drawings based on the drawings described herein without any creative effort.

Figure 1:
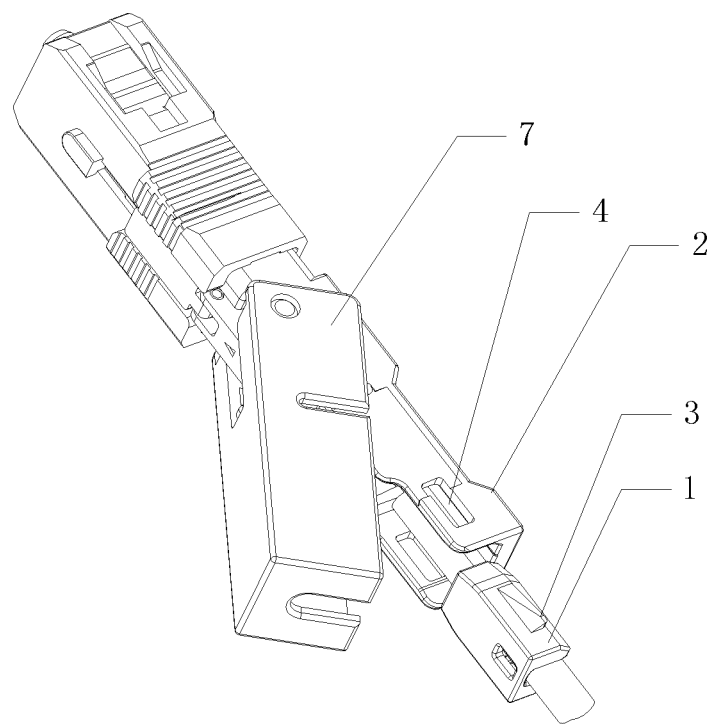
FIG. 1 is an explosive view of a snap-fit structure according to the present invention.

Reference numerals and denotations thereof:

1—cable retainer, 2—base, 3—ear clip, 4—snap-fit hole, 5—first outer lateral surface, 6—second outer lateral surface, 7—upper cover, 8—third outer lateral surface, 9—cable gripping rib.

DETAILED DESCRIPTION

Figure 2:
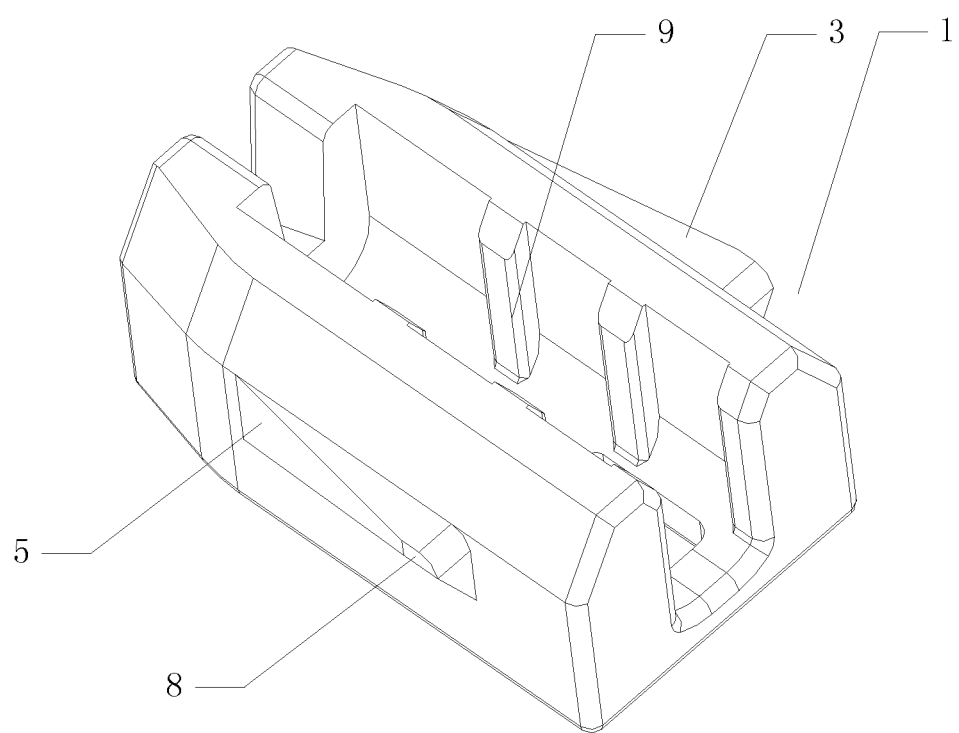
FIG. 2 is a schematic structural view taken from a view angle of a cable retainer of a snap-fit structure according to the present invention.
Figure 3:
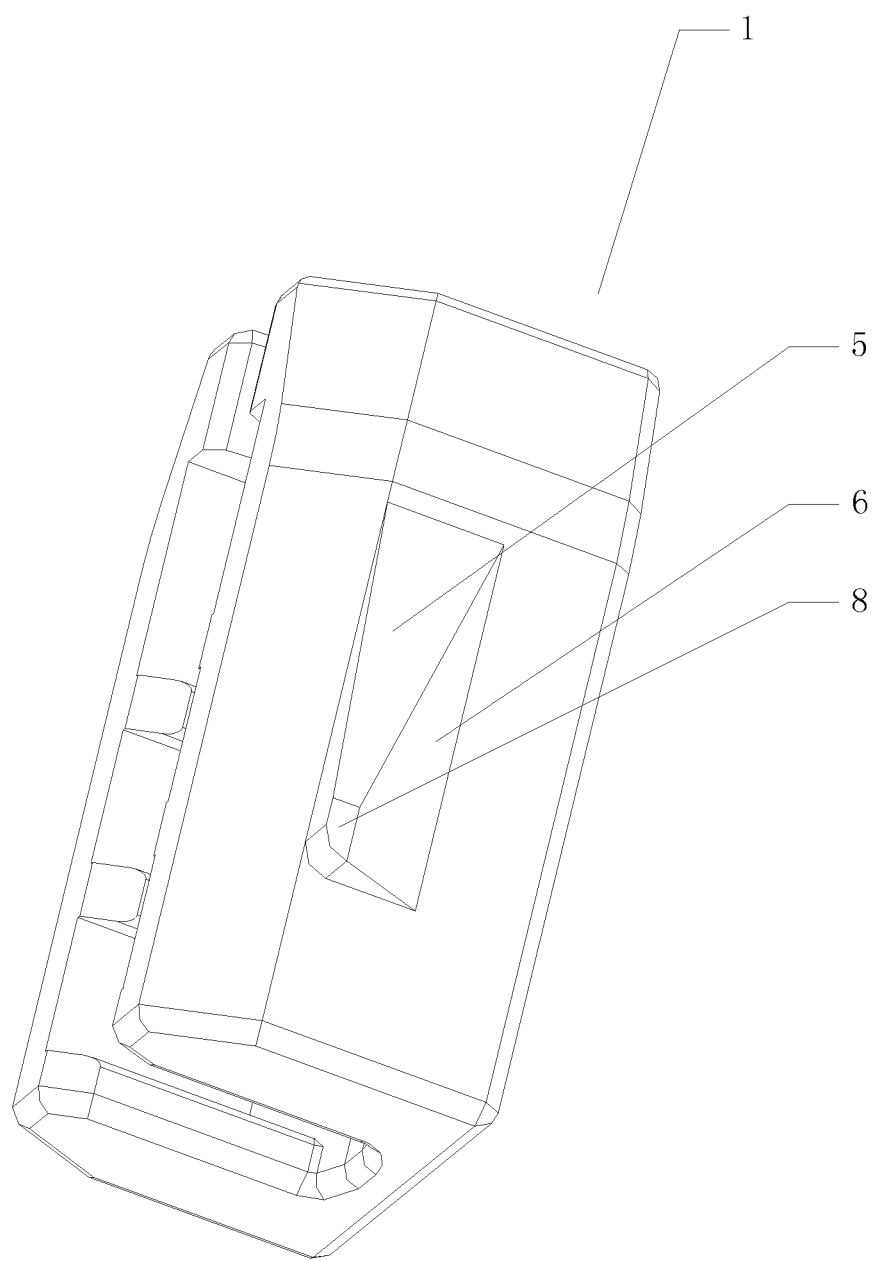
FIG. 3 is a schematic structural view taken from another view angle of a cable retainer of a snap-fit structure according to the present invention.
Figure 4:
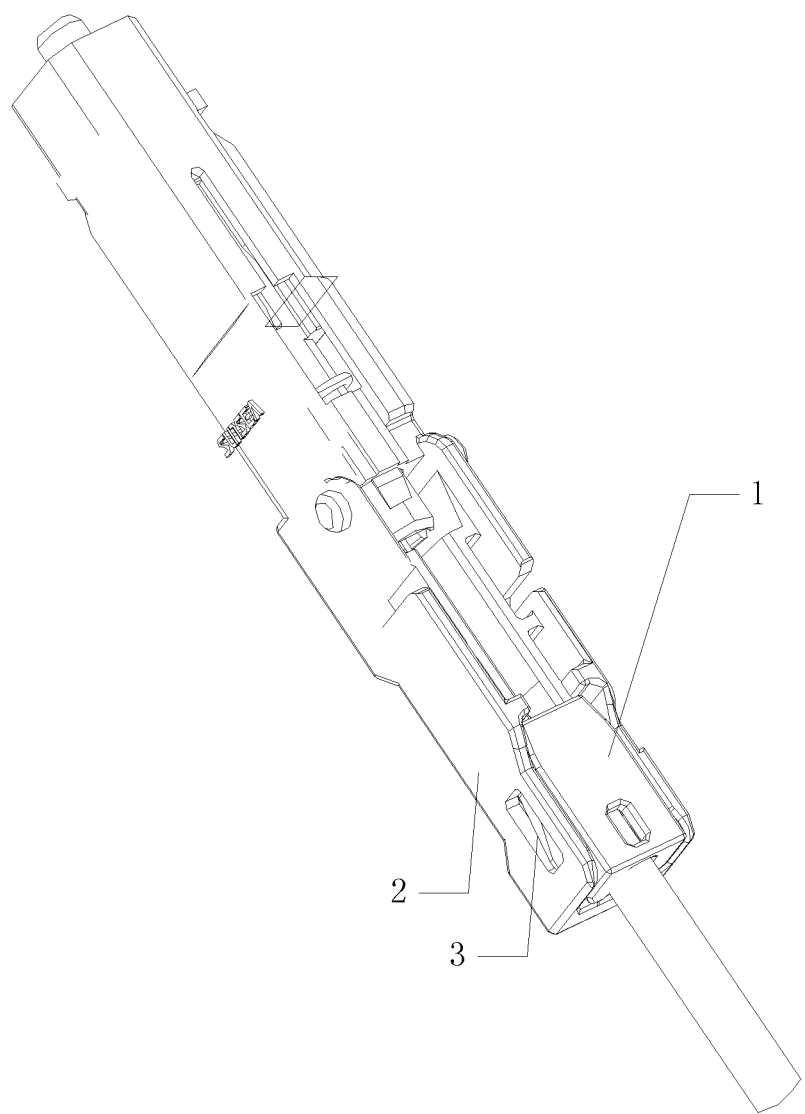
FIG. 4 is a schematic structural view illustrating assembling of a cable retainer and a base of the snap-fit structure according to the present invention.
Figure 5:
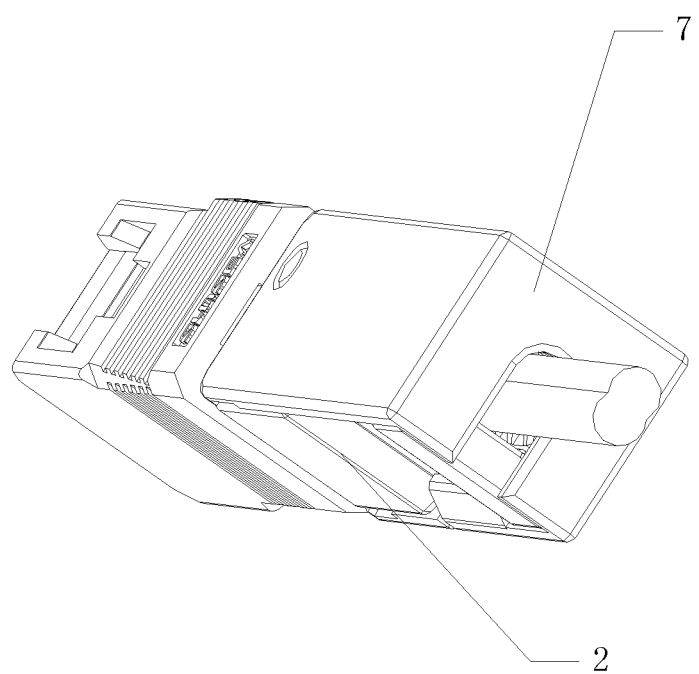
FIG. 5 is a schematic structural view of a snap-fit structure according to the present invention.

The present invention provides a snap-fit structure and an optical fiber splicer using the snap-fit structure. To make a person skilled in the art understand the technical solutions of the present invention more clearly and make the objectives, features and beneficial effects of the present invention clearer and more understandable, the present invention is hereinafter described in detail with reference to FIGS. 1 to 5 and specific embodiments.

Embodiment 1

A snap-fit structure is provided, comprising a cable retainer 1 and a base 2, the base 2 being provided with a snap-fit hole 4, the cable retainer 1 being provided with an ear clip 3, during assembling, the ear clip 3 being fitted into the snap-fit hole 4, wherein a second outer lateral surface 6 is arranged in a rising direction of the ear clip 3, the second outer lateral surface 6 in the rising direction of the ear clip 3 and a wall surface of the cable retainer 1 forming a wedge smaller at the top and larger at the bottom.

During disassembling, since the second outer lateral surface 6 in the rising direction of the ear clip 3 and a wall surface of the cable retainer 1 form a wedge smaller at the top and larger at the bottom, when the ear clip 3 is lift upwards, the ear clip 3 may be detached from the snap-fit hole 4 by applying a smaller force, and thus the cable retainer 1 is detached from the base 2. Therefore, the disassembling is convenient, and the requirements of quick and convenient detection, reassembling and repair of the optical fiber connector are accommodated.

In this embodiment, a first outer lateral surface 5 is arranged in a forward direction in which the ear clip 3 is assembled into the base 2 along the cable retainer 1, wherein a forward direction in which the first outer lateral surface 5 of the ear clip 3 is assembled into the base along the cable retainer 1 and the wall surface of the cable retainer 1 form a wedge smaller at the front larger at the rear. A rear wall surface of the ear clip 3 is parallel to a wall surface of the snap-fit hole 4. During assembling, since the forward direction in which the first outer lateral surface (5) of the ear clip (3) is assembled into the base along the cable retainer (1) and the wall surface of the cable retainer (1) form a wedge smaller at the front larger at the rear, the cable retainer 1 may be directed pushed into the base 2 from the rear portion thereof. The rear wall surface of the ear clip 3 is parallel to the wall surface of the snap-fit hole 4, and therefore the snap-fit hole 4 may be securely fix the ear clip 3 such that the ear clip 3 may not retreat, thereby ensuring that a sufficient force is applied for the fixing of the optical fiber.

In this embodiment, the first outer lateral surface 5 and the wall surface of the cable retainer 1 form an angle of 5 degrees. The 5-degree wedge-shaped angle ensures that the pushing of the cable retainer 1 may be pushed by applying only a smaller force. The angle formed between the first outer lateral surface 5 and the wall surface of the cable retainer 1 may also be 10 degrees, 15 degrees, 25 degrees, 30 degrees, 35 degrees, 40 degrees, 45 degrees, 50 degrees, 55 degrees, 60 degrees, 65 degrees, 70 degrees, 75 degrees, 80 degrees or the like acute angle.

In this embodiment, a rear portion of the base 2 is of a U shape, the cable retainer 1 is of an inverted U shape, and after the cable retainer 1 is assembled into the base 2, an opening at a lower end of the cable retainer 1 is sealed by the base 2. In this case, the cable retainer 1 and the base 2 form a top-to-bottom closed structure, and the optical fiber is clipped by the top-to-bottom closed structure. The snap-fit hole 4 is arranged on two arms of the base 2, and the ear clip 3 is arranged on two arms of the cable retainer 1. The ear clip 3 is fitted into the snap-fit hole 4, thereby forming a left-to-right symmetric structure. In such a structure, the ear clip 3 is subjected to a uniform force, and thus the assembling structure is secure. During disassembling, the two arms of the base 2 are lightly pushed outwards; and when the ear clip 3 is lift upwards, the ear clip 3 is separated from the snap-fit hole 4 via the wedge-shaped surface of the second outer lateral surface 6, thereby achieving disassembling of the optical fiber connector. The two arms of the base 2 is subjected to elastic deformation towards the left and right sides, which may not damage the structural integrity of the optical fiber connector. The fixed optical fiber may be conveniently disassembled and removed, thereby accommodating the requirements on inspection and repair, reassembling and fixing.

In this embodiment, the second outer lateral surface 6 and the wall surface of the cable retainer 1 form an angle of 5 degrees, that is, a wedge-shaped angle of 5 degrees. As an alternative solution, the angle formed between the second outer lateral surface 6 and the wall surface of the cable retainer 1 may also be 10 degrees, 15 degrees, 25 degrees, 30 degrees, 35 degrees, 40 degrees, 45 degrees, 50 degrees, 55 degrees, 60 degrees, 65 degrees, 70 degrees, 75 degrees, 80 degrees or the like acute angle.

In this embodiment, a lower wall surface of the ear clip 3 is parallel to the wall surface of the snap-fit hole 4, which ensures good cooperation between the ear clip 3 and the snap-fit hole 4 during working of the ear clip 3, such that the ear clip 3 may be securely fitted in the snap-fit hole 4.

In this embodiment, the snap-fit structure further comprises an upper cover 7, wherein after upon completion of assembling, an upper portion of the upper cover 7 presses against an upper surface of the cable retainer 1, and a lower portion of the upper cover 7 is fit into a bottom surface of the base 2. The upper cover 7 ensures that when the optical fiber does not need to be disassembled, the cable retainer 1 is fixed at its working site, and when the upper cover 7 leaves the working site, the cable retainer 1 may be detached from the upper portion of the cable retainer 2. This effectively ensures that a fixing force is applied to the optical fiber or rubber cable when the connector works, such that the optical fiber or rubber cable remains reliable and secure even when being pulled or dragged from any direction.

In this embodiment, the ear clip 3 further comprises a third outer lateral surface 8, wherein the third outer lateral surface 8 is parallel to the wall surface of the cable retainer 1, the first outer lateral surface 5 intersects the third outer lateral surface 8, and the second outer lateral surface 6 intersects the third outer lateral surface 8.

The intersection between the first outer lateral surface 5 and the second outer lateral surface 6 is an arc transitional structure, which ensures that the cable retainer 1 and the base 2 are assembled or disassembled conveniently.

In this embodiment, a cable gripping rib 9 is arranged on an inner wall surface of the cable retainer 1, wherein the cable gripping ribs 9 are pairedly and symmetrically arranged on the inner wall surface of the cable retainer 1, and three pairs of cable gripping ribs 9 are used. This ensures that the cable retainer 1 has a sufficient gripping and holding force for the optical fiber or rubber cable.

Embodiment 2

An optical fiber connector is provided, comprising the snap-fit structure described in Embodiment 1.

Embodiment 3

An optical fiber mechanical splice is provided, comprising the snap-fit structure described in Embodiment 1.

The technical principle of the present invention is described with reference to the specific embodiments. The description is given only for the purpose of illustrating the present invention, but cannot be interpreted in any manner as limiting the protection scope of the present invention. Based on such interpretation herein, a person skilled in the art would derive other specific embodiments without paying any creative effort. These derived embodiments all fall within the protection of the present invention.

What is claimed is:

1. A snap-fit structure, comprising a cable retainer and a base, the base being provided with a snap-fit hole, the cable retainer being provided with an ear clip, during assembling, the ear clip being fitted into the snap-fit hole, wherein a second outer lateral surface is arranged in a rising direction of the ear clip, the ear clip further comprises a first outer lateral surface and a third outer lateral surface, the third outer lateral surface is parallel to a wall surface of the cable retainer, the first outer lateral surface intersects the third outer lateral surface, the second outer lateral surface intersects the third outer lateral surface, and the first outer lateral surface intersects the second outer lateral surface, the second outer lateral surface in the rising direction of the ear clip and the wall surface of the cable retainer forming a wedge smaller at the top and larger at the bottom.

2. The snap-fit structure according to claim 1, wherein the first outer lateral surface is arranged in a forward direction in which the ear clip is assembled into the base along the cable retainer, the first outer lateral surface along the forward direction in which the cable retainer is assembled into the base and the wall surface of the cable retainer form a wedge smaller at the front larger at the rear.

3. The snap-fit structure according to claim 2, wherein the first outer lateral surface and the wall surface of the cable retainer form an angle of 5 to 80 degrees.

4. The snap-fit structure according to claim 3, wherein a rear portion of the base is of a U shape, the cable retainer is of an inverted U shape, and after the cable retainer is assembled into the base, an opening at a lower end of the cable retainer is sealed by the base.

5. The snap-fit structure according to 4, wherein the snap-fit hole is defined in two arms of the base, the ear clips are arranged on two arms of the cable retainer, and the second outer lateral surface and the wall surface of the cable retainer form an angle of 5 to 80 degrees.

6. The snap-fit structure according to claim 3, further comprising an upper cover, wherein after upon completion of assembling, an upper portion of the upper cover presses against the cable retainer, and a lower portion of the upper cover is fit into a bottom surface of the base.

7. The snap-fit structure according to claim 6, wherein the first outer lateral surface is arranged in the forward direction in which the ear clip is assembled into the base along the cable retainer.

8. The snap-fit structure according to claim 1, wherein the intersection between the first outer lateral surface and the wall surface of the cable retainer is an arc transitional structure.

9. The snap-fit structure according to claim 3, wherein a cable gripping rib is arranged on an inner wall surface of the cable retainer.

10. An optical fiber splicer, comprising:
a cable retainer and a base, the base being provided with a snap-fit hole, the cable retainer being provided with an ear clip, during assembling, the ear clip being fitted into the snap-fit hole, wherein a second outer lateral surface is arranged in a rising direction of the ear clip, the ear clip further comprises a first outer lateral surface and a third outer lateral surface, the third outer lateral surface is parallel to a wall surface of the cable retainer, the first outer lateral surface intersects the third outer lateral surface, the second outer lateral surface intersects the third outer lateral surface, and the first outer lateral surface intersects the second outer lateral surface, the second outer lateral surface in the rising direction of the ear clip and a wall surface of the cable retainer forming a wedge smaller at the top and larger at the bottom.

11. An optical fiber connector, comprising,
a cable retainer and a base, the base being provided with a snap-fit hole, the cable retainer being provided with an ear clip, during assembling, the ear clip being fitted into the snap-fit hole, wherein a second outer lateral surface is arranged in a rising direction of the ear clip, the ear clip further comprises a first outer lateral surface and a third outer lateral surface, the third outer lateral surface is parallel to a wall surface of the cable retainer, the first outer lateral surface intersects the third outer lateral surface, the second outer lateral surface intersects the third outer lateral surface, and the first outer lateral surface intersects the second outer lateral surface, the second outer lateral surface in the rising direction of the ear clip and a wall surface of the cable retainer forming a wedge smaller at the top and larger at the bottom.

* * * * *